May 13, 1969
J. W. WALBY
3,443,281
MOLDING PIN, MATRIX, AND MOLDING ASSEMBLY FOR
MANUFACTURE OF REFLECTIVE DEVICES
Filed July 24, 1967
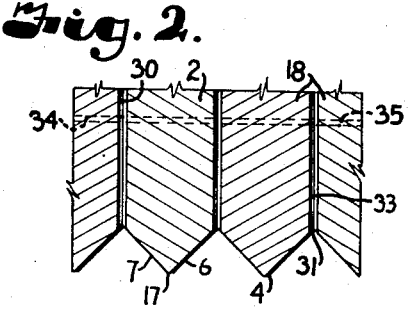
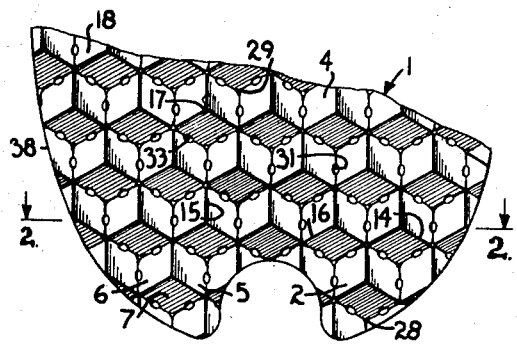
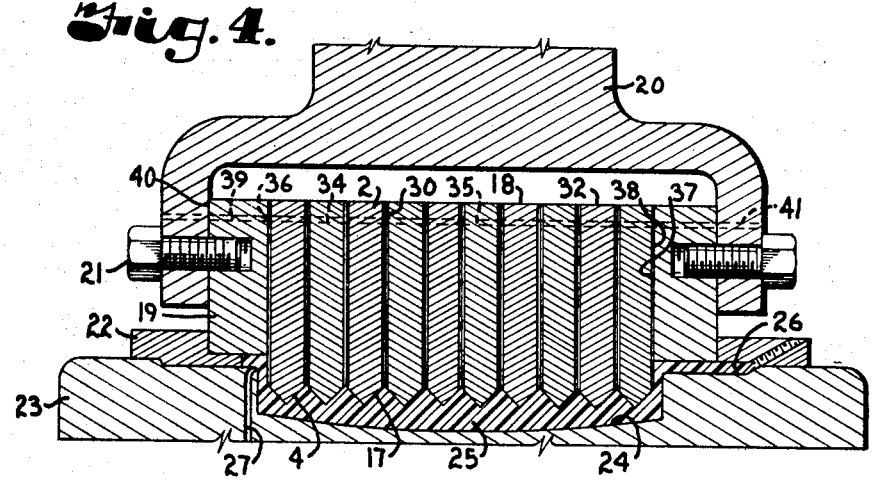
INVENTOR.
JOHN W. WALBY
Fishburn, Gold & Litman
ATTORNEYS

United States Patent Office 3,443,281
Patented May 13, 1969

3,443,281
MOLDING PIN, MATRIX, AND MOLDING
ASSEMBLY FOR MANUFACTURE OF REFLECTIVE DEVICES
John W. Walby, Blue Springs, Mo., assignor to Rupert Manufacturing Company, Blue Springs, Mo., a corporation of Missouri
Filed July 24, 1967, Ser. No. 655,619
Int. Cl. B29c 1/00
U.S. Cl. 18—44    3 Claims

ABSTRACT OF THE DISCLOSURE

A molding pin adapted to be grouped with similar molding pins to form a reflective mold matrix suitable for receiving thermoplastic mold material therein under high speed operations for making reflective devices. Each pin has an elongate body with a plurality of planar sides with slightly rounded edges and a longitudinal groove in each side intermediate the edges. The longitudinal groove extends from operating faces on one end of the body to a transverse groove around the body. The operating faces are machined and form cavities in the matrix which produce highly reflective surfaces in the reflective devices. The grouped pins form a plurality of longitudinal vent passageways extending from the operating faces to the transverse grooves and a plurality of transverse vent passageways communicating with a carrier and through the carrier to the atmosphere. The pins are secured together at an end opposite the operating faces to form a matrix unit of any desired shape.

---

The principal objects of the present invention are: to provide reflector mold apparatus having a plurality of longitudinal and transverse venting passageways communicating with the atmosphere so as to permit high-speed molding practices with consistent high quality reflector production; to provide such venting passageways which allow rapid and complete mold filling without significant disfiguration of molded reflective surfaces; to provide an improved mold matrix element adapted to be secured adjacent one end when positioned in a group of similar elements, each of which cooperate to form longitudinal vent passageways between abutting and contacting locating faces and which cooperate to form transverse vent passageways communicating with the atmosphere; to provide such a mold matrix element configuration which is easily formed and permits accurate dimensional control of the resulting locating faces; to provide such a mold matrix element which fits accurately into a group of similar elements for forming the mold matrix; and to provide an improved mold matrix and mold assembly which may be accurately and economically formed to produce high quality reflective devices by high speed molding operations.

Other objects and advantages of this invention will become apparent from the following description taken in connection with the accompanying drawings wherein are set forth by way of illustration and example certain embodiments of this invention.

FIG. 1 is a fragmentary face view showing a mold matrix face comprised of grooved pins or mold elements in locating face engagement forming vent passageways (exaggerated in relative size) therebetween.

FIG. 2 is a fragmentary cross-sectional view through a mold matrix taken on the line 2—2, FIG. 1, showing the locating face vent passageways (exaggerated in relative size) therebetween.

FIG. 3 is a fragmentary perspective view, on an enlarged scale from that of FIG. 1, of a mold element showing longitudinal grooves (exaggerated in relative size) on the locating faces thereof.

FIG. 4 is a cross-sectional view through a reflector mold embodying features of the present invention on a scale reduced from that of FIG. 1 and showing mold material therein.

Referring to the drawings in more detail:

The reference numeral 1 generally indicates a pin or mold element comprising an elongated body 2 of hexagonal cross-section along the length thereof. The body 2 forms a plurality of planar longitudinal locating faces 3 adapted to respectively contact similar locating faces on adjacent similar mold elements 1 for mutual positioning of the mold element 1 with respect to the adjacent elements. In the illustrated structure the body 2 is hexagonal and is provided at one end 4 thereof with three planar operating faces 5, 6 and 7 extending in accurate angular relation to each other and to the longitudinal locating faces 3. Each of the operating faces 5, 6 and 7 form a sharp or abrupt peripheral edges 8 and 9 with a respective adjacent intersecting pairs of locating faces 3. The peripheral edges 8 and 9 formed by each face 5, 6 and 7 respectively intersect at points 10 with respective edges 11 formed between the pair of locating faces 3 which join the respective operating face. The peripheral edges 8 and 9 of adjacent operating faces intersect at points 12 with respective edges 13 formed between a pair of adjacent locating faces 3 associated respectively with adjacent operating faces.

The operating faces 5, 6 and 7 extend in angular relation to each other as three intersecting faces on the corner of a cube and form sharp intersecting edges 14, 15 and 16 therebetween. The operating faces 5, 6 and 7 are adapted to cooperate with similar operating faces on adjacent similar mold elements to form a reflector mold matrix face 17 when the mold elements are secured together in a group comprising a mold matrix unit 18. In the illustrated example, the mold elements are suitably secured together as by welding, brazing or otherwise and the unit 18 is suitably secured in a carrier 19 which, in turn, is secured to a mold plunger 20 by suitable fastening devices such as screws 21. A ring 22 is arranged on the mold body 23 and is adapted to cooperate with the carrier 19 to produce a seal therebetween when the plunger 20 is moved toward the mold body 23 for closing the mold. A mold cavity 24 is located between the matrix face 17 and mold body 23 corresponding to the reflecting device 25 to be formed. The ring 22, in the illustrated example, has a suitable gate passageway 26 into the cavity 24 and a plurality of suitable vent passageways 27 are provided in the mold body 23 to permit the major portion of air trapped in the mold cavity 24 to exit therefrom as the mold material moves laterally across the cavity 24 from the gate passageway 26.

In operation, mold material, for example a transparent synthetic thermoplastic resin, is forced under pressure into the mold cavity 24 and forms prismatic depressions corresponding to the operating faces 5, 6 and 7 of each mold element in the matrix face 17. After the mold material has set sufficient to retain its shape without slumping or distortion, the plunger 20 is drawn away from the mold body 23 and the finished reflecting device is removed from the mold cavity.

The side edges 11 and 13 of the mold elements are slightly rounded forming a matrix vent passageway 28 at the intersection of any three contacting mold elements in the mold matrix (shown exaggerated in size, FIG. 1). The adjacent operating faces on said three contacting mold elements form a cavity 29 for receiving the molding material, the peripheral edges 8 and 9 of each operating face being depressed into the cavity or, in other words, toward the mold elements making up the matrix face 17. The peripheral edges 8 and 9 of each operating face are adapted to rest or seat adjacent similar peripheral edges on contacted mold elements for closing the bottom of the cavities 29. This is in contrast to the intersecting edges 14, 15 and 16 of the respective mold elements which protrude outwardly from the mold elements or matrix face 17.

The radius of the side edges 11 and 13 is carefully controlled so that the resultant matrix vent passageways 28 are small enough in maximum cross-sectional dimension to prevent the mold material from entering thereinto under the pressure and heat conditions found in the mold. The mold material thus bridges across the mouth of the matrix vent passageways 28 and is completely removed as part of the reflecting device when it is removed from the mold. Due to the cross-sectional size limitation of the vest passageways 28, molding speed is limited because sufficient air cannot be bled therethrough in a short period of time to properly fill the cavities 29. Also, air is sometimes trapped in positions in the matrix face 17 where it cannot bleed out through the passageways 28.

To alleviate these drawbacks, a fractional circular continuous longitudinal groove 30 (shown exaggerated in size) is formed in each of the locating faces 3 and extends longitudinally therealong, bisecting same. The grooves 30 are preferably simultaneously formed in the mold elements by means of a suitably shaped draw die at the same time the elements are sized to the desired accurate hexagonal cross section and before the operating faces 5, 6 and 7 are cut and machined. In the finished mold element, each of the grooves 30 originates at a peripheral edge 8 or 9 producing a pair of slight edge openings 31 in the respective operating face and extends outwardly from the mold material along a locating face 3 to another end surface or opposed end portion 32 of the element 1 opposed from the one end 4 and the operating faces 5, 6 and 7.

When the mold elements are grouped together to form the mold matrix unit 18, the respective grooves 30 become aligned with adjacent grooves on the locating faces of adjacent mold elements forming elongated longitudinal venting passageways 33 communicating with the cavities 29 intermediate the respective peripheral edges 8 and 9. The grooves 30 respectively have a depth not greater than one-half the maximum permissible diameter of a vent passageway which blocks mold material flow thereinto under molding conditions necessary for making high production reflecting devices. A suitable depth for the grooves 30 has been found to be about .0005 inch.

The resulting venting passageways 33 allow suffiicient cross-sectional vent area for the air trapped in the cavities 29 to escape rapidly enough for high-speed molding operations without permitting blockage of any of the passageways with the molding material. Also, the positioning of the passageways 33 permits the removal of any air pockets which may not communicate with the passageways 28. Further, it has been determined that the use of the venting passageway 33 results in reflector devices with flatter reflecting faces, better finish and sharper edges formed at the peripheral edges 8 and 9 of the matrix face 17. The formation of the grooves 30 in the respective mold elements has been found to add very little to the cost of mold matrix production but the resulting venting passageways 33 permit a significant increase in product output rate and quality. A further advantage of the grooves 30 in the respective mold elements is that the elements locate with respect to each other more accurately in the matrix because the absence of central surface on the respective mating locating faces avoids the possibility of the elements rocking on each other.

The welding or brazing of the end surfaces 32 may close the longitudinal venting passageways 33 therefore a transverse groove 34 extends around the body 2. The transverse groove 34 intersects the edges 11 and 13 and the longitudinal grooves 30. It is preferable that the transverse groove 34 be closer to the other end surface 32 than the one end 4. The grouping of the mold pins or elements 1 together in the mold matrix unit 18 aligns the respective transverse grooves 34 forming transverse venting passageways 35.

A circumferential groove 36 extends along an inside surface 37 of the carrier 19 and is so positioned as to align with the respective transverse grooves 34 of the mold elements 1 which are positioned in an exterior surface 38 of the mold matrix unit 18. A plurality of carrier venting passageways 39 extend through the carrier 19 and connect the circumferential grooves 36 with an exterior surface 40 of the carrier 19. A plurality of plunger venting passageways 41 in the plunger 20 are positioned to align with the carrier venting passageways 39.

Air trapped in the cavities 29 communicates to the atmosphere through the matrix vent passageways 28 or the longitudinal vent passageways 33 to the transverse vent passageways 35, through the transverse vent passageways 35, through the transverse vent passageway 35 to the circumferential groove 36, through the cimcumferential groove 36 to the carrier venting pasageways 39, through the carrier venting passageways 39 to the plunger venting passageways 41, and through the plunger venting passageways 41 to the atmosphere.

The pin 1 having the longitudinal grooves 30 on each locating face 3 and the transverse groove 34 around the body 2 is particularly adapted for use in matrix units having the end surfaces 32 closed by welding, brazing, or method of mounting with the respective grooves insuring venting regardless of method of mounting and support therefor.

It is to be understood that while one form of this invention has been illustrated and described, it is not to be limited to the specific form or arrangement of parts herein described and shown except insofar as such limitations are included in the claims.

What I claim and desire to secure by Letters Patent is:

1. A mold element matrix unit having an exterior surface and comprising:
   (a) a group of mold elements, each having an elongated body of hexagonal cross section along at least a portion thereof, said portion having six planar longitudinal locating faces adapted to respectively contact locating faces of adjacent mold elements for mutually positioning said mold elements with respect to said adjacent elements,
   (b) a plurality of planar operating faces extending in angular relation to said longitudinal locating faces and forming peripheral edges at the intersections therewith, said operating faces being at one end of said body, said peripheral edges being adapted to seat adjacent peripheral edges on adjacent mold elements, said operating faces being adapted to cooperate with operating faces on adjacent mold elements to form a reflector mold matrix face with said peripheral edges depressed thereinto producing spaced cavities for receiving thermoplastic material to be molded,
   (c) said mold elements being secured together adjacent an opposed end portion of said body by welding, thereby forming said mold matrix unit,
   (d) a transverse groove around said body of each mold element intermediate its ends, said transverse groove being substantially aligned with respective similar grooves on adjacent mold elements to form venting passageways providing communication with the exterior surface of said matrix unit,
   (e) an elongated longitudinal groove extending longitudinally along said longitudinal locating faces and bisecting same, each of said longitudinal grooves originating at one of said peripheral edges forming a slight edge opening in the respective operating face, said longitudinal groove extending to said transverse groove, said longitudinal grooves being substantially alined with respective similar grooves on locating faces of adjacent mold elements to form elongated longitudinal venting passageways providing communication between said cavities and the exterior surface of said matrix unit through said transverse grooves, said longitudinal passageways having a maximum cross-sectional size not greater than the maximum size of a passageway which blocks mold material flow thereinto under high speed molding conditions for making reflecting devices.

2. The mold matrix unit as set forth in claim 1 wherein the matrix unit is adapted to be retained in carrier means, said carrier means comprising:
   (a) a surface contacting said mold matrix exterior surface,
   (b) a circumferential groove in said carrier means surface, said groove aligning with and cooperating with said transverse grooves,
   (c) a plurality of vent passageways through said carrier means, said vent passageways communicating with said circumferential groove in said carrier means surface whereby entrapped air escapes to the atmosphere.

3. A mold matrix unit having an exterior surface and comprising:
   (a) a group of mold element pins cooperating to form an operating face and having an opposed face spaced from the operating face,
   (b) each of said pins having an elongate body of polygonal cross-section along at least a portion thereof with a plurality of locating faces respectively contacting locating faces of adjacent pin bodies,
   (c) each of said pins having a plurality of operating faces at one end of said body with said operating faces forming a peripheral edge with the locating faces and cooperating in forming the operating face of the matrix,
   (d) said group of pins being secured one to the other adjacent said opposed face of the matrix by welding,
   (e) a transverse groove around each of the pin bodies intermediate its ends and spaced from the welded portion with the transverse groove of one pin body substantially aligned with a transverse groove of an adjacent pin body to form venting passageways providing communication with the exterior surface of said matrix,
   (f) a longitudinal groove extending along each of said locating faces of each pin with said longitudinal grooves originating at the respective peripheral edge of the pin and extending to the respective transverse groove producing an edge vent extending from the operating face of the matrix to the transverse grooves.

References Cited

UNITED STATES PATENTS

| | | | |
|---|---|---|---|
| 1,898,251 | 2/1933 | Kopp | 249—141 X |
| 2,976,571 | 3/1961 | Moslo. | |
| 3,277,535 | 10/1966 | Rupert. | |

J. HOWARD FLINT, JR., *Primary Examiner.*

U.S. Cl. X.R.

249—117, 141